United States Patent
Diehl et al.

(10) Patent No.: US 7,597,529 B2
(45) Date of Patent: Oct. 6, 2009

(54) METHOD FOR FILLING A VERTICAL TUBE WITH CATALYST PARTICLES

(75) Inventors: Volker Diehl, Ellerstadt (DE); Steffen Rissel, Kirchheim (DE); Silke Berndt, Mannheim (DE); Mark Duda, Ludwigshafen (DE); Knut Eger, Limburgerhof (DE); Markus Hoelzle, Kirchheim (DE); Veron Nsunda, Namur (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 204 days.

(21) Appl. No.: 10/568,613

(22) PCT Filed: Aug. 17, 2004

(86) PCT No.: PCT/EP2004/009226

§ 371 (c)(1),
(2), (4) Date: Feb. 16, 2006

(87) PCT Pub. No.: WO2005/018791

PCT Pub. Date: Mar. 3, 2005

(65) Prior Publication Data

US 2006/0233631 A1    Oct. 19, 2006

(30) Foreign Application Priority Data

Aug. 19, 2003 (DE) ................. 103 37 998

(51) Int. Cl.
*B65B 1/06* (2006.01)
*B65G 69/02* (2006.01)

(52) U.S. Cl. ............. 414/804; 414/160; 414/287; 414/808

(58) Field of Classification Search ........... 414/160, 414/208, 287, 293, 299, 804, 808; 193/32
See application file for complete search history.

(56) References Cited

U.S. PATENT DOCUMENTS 3,562,998 A * 2/1971 Edwards ............... 53/459
3,608,751 A    9/1971 Hundtofte et al.

(Continued)

FOREIGN PATENT DOCUMENTS

EP    0 130 595    1/1985

(Continued)

OTHER PUBLICATIONS

Nikolov et al., "Achievements in the Production of Phthalic Anhydride by Vapour Phase Oxidation of o-xylene in Fixed Catalyst Bed", Rassegne Di Scienza E Tecnologia.

(Continued)

*Primary Examiner*—James Keenan
(74) *Attorney, Agent, or Firm*—Oblon, Spivak, McClelland, Maier & Neustadt, L.L.P.

(57) ABSTRACT

A method of charging a vertical tube having an internal diameter of 50 mm or less with catalyst particles, which comprises introducing a filling aid into the vertical tube, where the filling aid comprises a flexible elongated body and the ratio of the cross section of the flexible elongated body to the cross section of the tube is from 0.003 to 0.08, and introducing the catalyst particles into the tube.

25 Claims, 3 Drawing Sheets

U.S. PATENT DOCUMENTS

| | | | | |
|---|---|---|---|---|
| 3,749,258 A | * | 7/1973 | James | 414/808 |
| 4,701,101 A | * | 10/1987 | Sapoff | 414/804 |
| 5,498,731 A | | 3/1996 | Tsurita et al. | |
| 6,932,559 B2 | * | 8/2005 | Boe et al. | 414/808 |

FOREIGN PATENT DOCUMENTS

| | | |
|---|---|---|
| EP | 0 548 999 | 5/1996 |
| GB | 313 168 | 7/1930 |
| WO | 00/44488 | 8/2000 |

OTHER PUBLICATIONS

Bohning et al., "Festbettreaktor Mit Stromungstechnisch Gunstigen Katalysator-Korpern," Chem.-Ing. Tech. 57 (1985), Nr 8, S. 682-684.

Nikolov et al., "Oxidation of o-Xylene Into Phthalic Anhydride in a Reactor With Two Fixed Beds of Vanadium-Titania Catalyst," Chem. Eng. Process., 25, (1989) 127-131.

* cited by examiner

METHOD FOR FILLING A VERTICAL TUBE WITH CATALYST PARTICLES

BACKGROUND OF THE INVENTION

1. Field of the Invention

The present invention relates to a method of charging a vertical tube with catalyst particles. Such catalyst-filled tubes are employed for carrying out various catalytic gas-phase reactions. Depending on the type of catalyzed reaction, the tubes are heated from the outside or are surrounded by a heat transfer medium such as a salt melt to remove heat. The catalyst particles either consist of a catalytically active composition which has been shaped, with or without use of suitable binders, by extrusion, tableting or the like to give shaped bodies (all-active catalysts) or they comprise a catalytically active composition which is applied in the form of a shell to an inert support (coated catalysts). They can be in the form of spheres, rings, cylinders, cubes, cuboids, or other geometric bodies.

2. Description of the Related Art

When the catalyst particles are introduced into the tube, catalyst particles can break or the catalytic active composition can be partly detached from the support as a result of mechanical stress, depending on the lateral compressive strength and the fracture strength of the catalysts used. The fragments or abraded material formed increase the density of the catalyst bed and during later operation of the tube reactors lead in a disadvantageous fashion to increased pressure drops.

It has therefore been proposed that the speed at which the catalyst particles fall during introduction into the tube be reduced by use of particular filling aids. Thus, EP-A 548 999 describes a method of charging tubes in which the catalyst particles are introduced along a string having flexible bristles which extend in the transverse direction and are located at a distance from one another.

A further method of introducing catalyst particles into a tube is described in U.S. Pat. No. 3,608,751. The filling aid used here is a flexible body, e.g. a hemp rope, to which oblique blades are affixed.

Although the known methods are well-suited to filling steam reformer tubes which typically have an internal diameter of about 10 cm, they are unsuitable for tubes having smaller internal diameters, as are customarily used for exothermic gas-phase reactions, in particular gas-phase oxidations. Just the introduction of the string bearing bristles or blades into a narrow tube is much more difficult. In addition, the bristles or blades of the known filling aids quickly lead to blocking of the tube or enmeshing of the catalyst particles in the case of small tube diameters.

It is an object of the present invention to provide a method by means of which vertical tubes having a small tube diameter, as are used for gas-phase oxidation reactions, can be charged with catalyst particles while avoiding, firstly, catalyst fracture or abrasion and, secondly, blockages and enmeshing of the catalyst particles.

SUMMARY OF THE INVENTION

We have found that this object is achieved by a method of charging a vertical tube having an internal diameter of 50 mm or less, preferably 40 mm or less, in particular from 20 to 30 mm, with catalyst particles, which comprises
introducing a filling aid (3) into the vertical tube (1), where the filling aid comprises a flexible elongated body and the ratio of the cross section of the flexible elongated body to the cross section of the tube (1) is from 0.003 to 0.08, preferably from 0.005 to 0.07 and particularly preferably from 0.01 to 0.06, and
introducing the catalyst particles (2) into the tube (1).

The filling aid has no elements such as bristles or blades which extend radially outward from the flexible body and whose projection onto a plane perpendicular to the longitudinal direction of the filling aid has a larger area than the cross section of the flexible body, preferably greater than half the cross section of the flexible body. When, in preferred embodiments, the filling aid has spacers extending perpendicular to the longitudinal direction of the filling aid, the area of their projection is negligible compared to the cross section of the flexible body.

It has surprisingly been found that in the case of small tube cross sections, a sufficient reduction in the velocity of descent of the catalyst particles can be achieved by an appropriate cross section of the flexible body and that additional damping elements which extend radially outward from the flexible body and could lead to enmeshing of the catalyst particles are not necessary. The braking of the catalyst particles is presumably due to excitation of transverse oscillations of the flexible body or formation of air vortices.

The flexible elongated body of the filling aid can be, for example, a string, a tape or a rope. In general, the flexible body comprises a textile string or a textile tape, e.g. braided natural or synthetic fibers such as nylon. However, ropes made of metal wires, e.g. a stainless steel rope, are likewise suitable.

In preferred embodiments, the flexible elongated body has an essentially circular cross section. The ratio of the diameter of the flexible elongated body to the diameter of the tube is preferably from 0.1 to 0.3, more preferably from 0.1 to 0.25. Suitable bodies are, for example, nylon strings having diameters of from about 2.5 to 5 mm, including noncircular cross sections, e.g. Bonder 0.5-2/5-10 mm.

As an alternative, it is possible to use filling aids whose flexible elongated body has a noncircular, e.g. rectangular, cross section. Thus, tapes having a thickness of from 0.5 to 2 mm and a width of from 5 to 10 mm can be used successfully.

The filling aid preferably has a rigid terminating element (element 4 in FIG. 1 and FIG. 2) whose density is greater than that of the flexible body at its lower end. Introduction of the filling aid into the tube is aided by such a terminating element.

In a preferred embodiment, the filling aid can be uniform over the length introduced into the tube. The filling aid is then a smooth filling aid without dampers, spacers or the like. However, it has sometimes been found to be advantageous for the filling aid to have spacers which are located at a distance from one another and extend perpendicular to the longitudinal direction of the filling aid. Such spacers ensure that the filling aid always hangs essential centrally in the tube. The spacers are preferably very thin in order to minimize the risk of blockage caused by descending catalyst particles.

In general, the filling aid is withdrawn stepwise or continuously from the tube as the introduction of catalyst particles progresses, so that the lower end of the filling aid is always above the fill height of the catalyst particles in the tube.

A suitable procedure comprises:
introducing the filling aid into the tube in such a way that the lower end of the filling aid is located at a first height,
introducing catalyst particles into the tube to below the first height,
if desired, partly withdrawing the filling aid from the tube so that the lower end of the filling aid is located at a second or further height and introducing catalyst particles into the tube to below the second or further height, withdrawing the filling aid completely from the tube and filling the tube with catalyst particles up to the final fill height.

In the simplest embodiment, the filling aid is introduced into the tube so that its lower end divides the tube length in any desired ratio, a first layer of catalyst particles is introduced into the tube to below the end of the filling aid, the filling aid is withdrawn from the tube and a second layer of (identical or different) catalyst particles is introduced into the tube. It has been found that when this embodiment of the method is employed, the pressure drop is up to 10% lower than when the tube is charged without the filling aid.

In another embodiment of the method of the present invention, the filling aid initially extends into the tube to ⅔ of the length of the tube, catalyst particles are then introduced to below the lower end of the filling aid, the filling aid is then withdrawn to ⅓ of the length of the tube, catalyst particles are then introduced to below the lower end of the filling aid, the filling aid is then fully withdrawn and the tube is then filled completely with catalyst particles. It has been found that this embodiment of the method is advantageous in the case of tube lengths of from three to eight meters. During operation of the tube reactor, the pressure drops were up to 20% lower than when charging methods in which the catalyst particles are introduced without a filling aid were employed.

In another embodiment of the method of the present invention, the filling aid initially extends into the tube over essentially the entire length of the tube. Catalyst particles are then introduced and the filling aid is simultaneously withdrawn from the tube at a rate corresponding to the increase in the fill height of the catalyst particles. It has been found that in the case of tube lengths of from three to six meters, this embodiment of the method results in a pressure drop which is up to 40% lower than when the tube is charged without a filling aid.

The catalyst particles are preferably introduced into the tube at an essentially constant speed, in particular by means of suitable filling machines. Such filling machines are generally made for simultaneously charging a plurality of tubes. They have a hopper having a plurality of chambers from which the catalyst particles are injected onto an inclined vibratory chute. When the vibratory chute is started up, the catalyst particles slide uniformly over the chute and drop through holes in the chute into the tubes located underneath.

The catalyst particles generally have a (maximum) diameter of from 2 to 15 mm, preferably from 3 to 8 mm. All-active catalysts consist of a catalytically active composition which is shaped, with or without use of suitable binders, by extrusion, tableting or other methods to give shaped bodies such as extrudates, pellets or the like. Coated catalysts comprise a catalytic composition, generally a mixed metal oxide, applied in the form of a shell to an inert support. They can be in the form of spheres, rings, cylinders, cubes, cuboids or other geometric bodies.

Such catalysts are known per se and are employed, for example, for the preparation of unsaturated aliphatic carboxylic acids or aldehydes, e.g. acrylic acid, methacrylic acid or acrolein, by gas-phase oxidation of aldehydes, alkanes or alkenes; the preparation of nitriles such as acrylonitrile, methacrylonitrile by ammoxidation of alkanes or alkenes or the preparation of aromatic carboxylic acids or anhydrides, e.g. benzoic acid or phthalic anhydride, by gas-phase oxidation of aromatic hydrocarbons such as toluene, o-xylene or naphthalene. Further catalysts are catalysts which catalyze hydrogenations of a variety of types or catalysts for the synthesis of methanol from synthesis gas.

It has surprisingly been found that when tubes are charged using the method of the present invention, a less densely packed, looser bed having a lower bulk density than when the tubes are charged without the assistance of a filling aid is produced. This results in an advantageous reduction in the pressure drop when a gas is passed through the charged tube during operation. As a result of the reduced pressure drop, compression energy can be saved during operation of the reactor, since the gas fed into the reactor has to be compressed to a lower pressure level. In addition, a looser catalyst bed has the advantage that the reaction zone in the tube is distributed over a greater length, which in the case of strongly exothermic reactions leads to smaller temperature increases in the tube under reaction conditions. On the other hand, when tubes having a greater diameter, e.g. the steam reformer tubes of the abovementioned prior art, are charged, higher ordered packings having a higher bulk density of the catalyst bed are obtained when using filling aids than when no filling aids are employed.

The invention will now be illustrated by means of examples and the accompanying drawings.

DETAILED DESCRIPTION OF THE INVENTION

Figure 1:
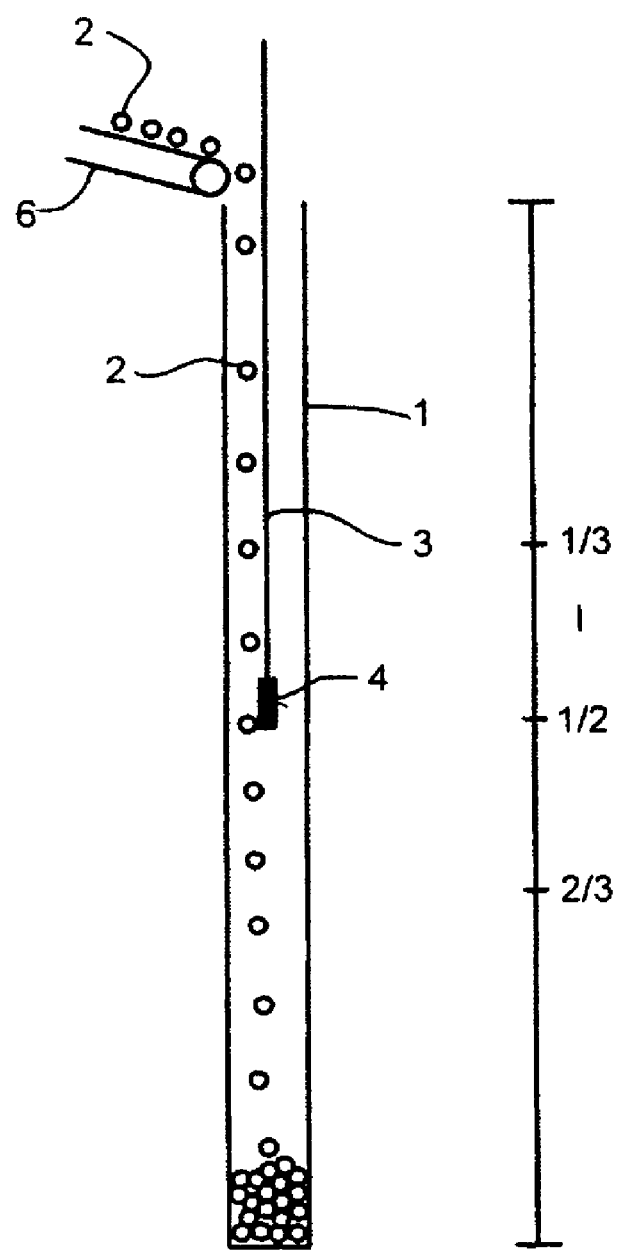
FIG. 1 shows a section through a tube into which a filling aid according to a first embodiment has been hung.
Figure 2:
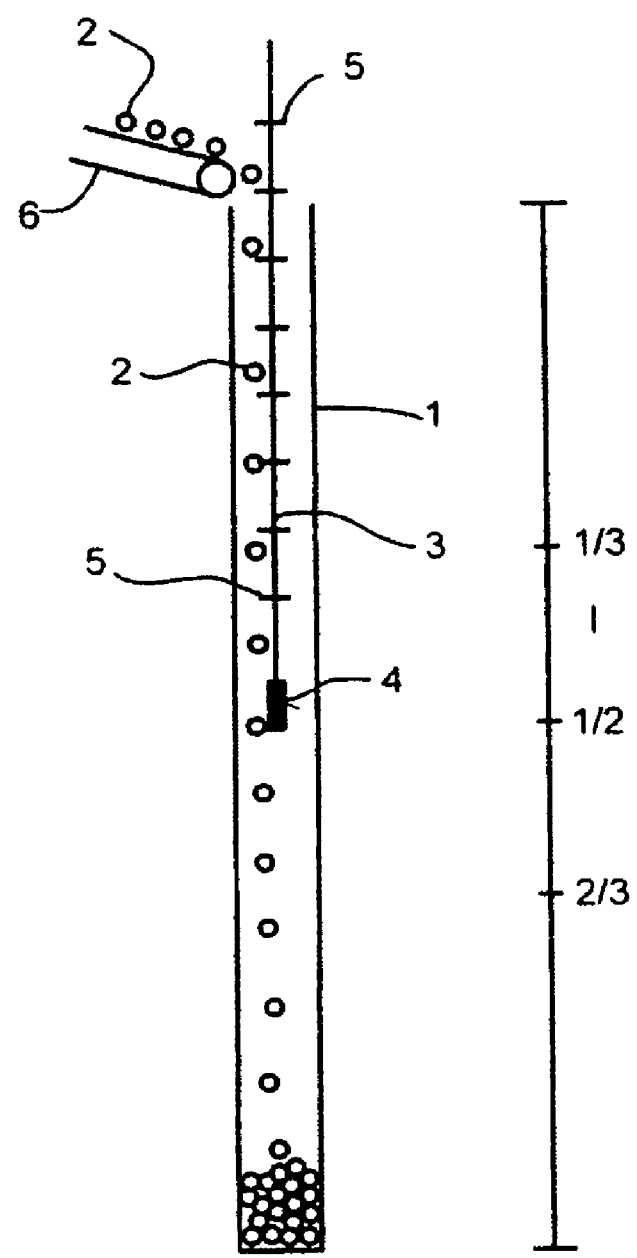
FIG. 2 is a schematic showing of a section through a tube into which a filling aid according to a second embodiment has been hung.
Figure 3:
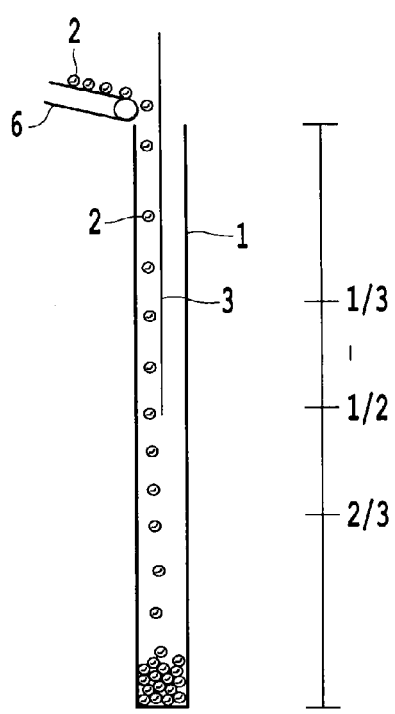
FIG. 3 shows a section through a tube into which a filling aid that does not have a rigid terminating element according to a third embodiment has been hung.
Figure 4:
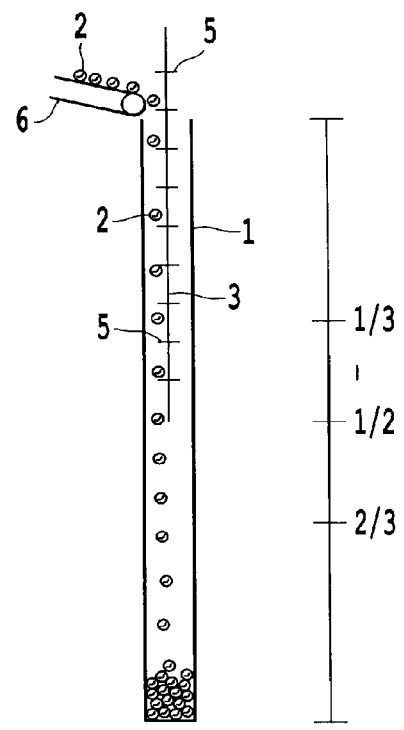
FIG. 4 shows a section through a tube into which a filling aid that does not have a rigid terminating element according to a third embodiment has been hung.

In the examples indicated below, a tube 1 is charged with catalyst particles 2. A plurality of parallel tubes 1 form a shell-and-tube reactor which is suitable for carrying out gas-phase oxidation reactions. Before charging of the tube 1, a flexible string 3 which serves as filling aid is introduced into the tube. The string shown in FIG. 1 and FIG. 3 is a smooth string without spacers, while the string shown in FIG. 2 and FIG. 4 is a string into which spacers 5 have been introduced at regular intervals. After the string 3 has been introduced into the tube 1, catalyst particles 2 are poured into the tube 1. As transport device 6 for the catalyst particles 2, it is possible to use either a vibratory chute or a conveyor belt. Furthermore, any number of tubes can be charged simultaneously by combining a plurality of transport devices operating in parallel. In this case, it is possible to use automatic unrolling devices which introduce the strings 3 into the tubes 1 and withdraw them again.

The invention is illustrated by the following examples. In the examples, the tubes are charged by means of charging machines which introduce the catalyst particles into the tubes by means of vibration from a stock vessel via a vibratory chute.

EXAMPLE 1

Comparative Example

A tube having an internal diameter of 25 mm and a length of 4500 mm is charged with 2160 g of a catalyst (ring shape; external diameter×height×internal diameter: 7×7×4 mm) without a filling aid. Charging took about 1 minute. The differential pressure established when 2000 standard l/h of air (20° C.) were passed through was then determined.

| Experiment No. | Fill height (cm) | Differential pressure (mbar) |
|---|---|---|
| 1 | 370 | 84 |
| 2 | 368 | 96 |
| 3 | 370 | 100 |
| 4 | 370 | 94 |
| 5 | 365 | 91 |
| 6 | 368 | 108 |
| 7 | 377 | 105 |
| 8 | 374 | 95 |
| 9 | 365 | 65 |
| 10 | 366 | 93 |
| 11 | 366 | 96 |
| 12 | 364 | 105 |
| 13 | 364 | 97 |
| 14 | 372 | 87 |
| 15 | 375 | 86 |
| 16 | 372 | 89 |
| 17 | 380 | 81 |
| 18 | 376 | 85 |
| 19 | 384 | 89 |
| 20 | 378 | 93 |
| 21 | 360 | 112 |
| 22 | 378 | 84 |
| 23 | 377 | 90 |
| 24 | 381 | 91 |
| 25 | 375 | 95 |
| 26 | 377 | 90 |
| 27 | 375 | 89 |
| 28 | 384 | 88 |
| 29 | 381 | 87 |
| 30 | 384 | 90 |
| Mean | 373.20 | 91.73 |
| Min | 360.00 | 65.00 |
| Max | 384.00 | 112.00 |
| Standard deviation | 6.68 | 8.96 |

EXAMPLE 2

Example 1 was repeated, but a nylon string having a diameter of 4 mm and weighted at the end was allowed to hang into the tube to a depth of 2600 mm, 720 g of catalyst were introduced, the string was withdrawn so that it hung into the tube to a depth of 1200 mm, a further 720 g of catalyst were introduced, the string was removed and a further 720 g of catalyst were introduced. Charging took about 20 s for each of the layers introduced.

| Experiment No. | Fill height (cm) | Differential pressure (mbar) |
|---|---|---|
| 1 | 385 | 71 |
| 2 | 380 | 80 |
| 3 | 382 | 69 |
| 4 | 380 | 75 |
| 5 | 374 | 84 |
| 6 | 378 | 76 |
| 7 | 391 | 72 |
| 8 | 387 | 84 |
| 9 | 376 | 74 |
| 10 | 375 | 72 |
| 11 | 387 | 72 |
| 12 | 382 | 71 |
| 13 | 370 | 89 |
| 14 | 388 | 74 |
| 15 | 387 | 69 |
| 16 | 390 | 64 |
| 17 | 391 | 69 |
| 18 | 378 | 86 |
| 19 | 376 | 76 |
| 20 | 375 | 52 |
| 21 | 388 | 67 |
| 22 | 394 | 70 |
| 23 | 394 | 71 |
| 24 | 386 | 68 |
| 25 | 374 | 77 |
| 26 | 384 | 76 |
| 27 | 380 | 67 |
| 28 | 385 | 68 |
| 29 | 394 | 72 |
| 30 | 385 | 76 |
| Mean | 383.14 | 72.93 |
| Min | 370.00 | 52.00 |
| Max | 394.00 | 89.00 |
| Standard deviation | 6.79 | 7.27 |

EXAMPLE 3

Example 1 was repeated, but a nylon string having a diameter of 4 mm and weighted at the end was allowed to hang into the tube to a depth of 2000 mm, 1080 g of catalyst were introduced, the string was removed and a further 1080 g of catalyst were introduced. Charging took about 30 s for each of the layers introduced.

| Experiment No. | Fill height (cm) | Differential pressure (mbar) |
|---|---|---|
| 1 | 366 | 94 |
| 2 | 382 | 84 |
| 3 | 382 | 83 |
| 4 | 368 | 91 |
| 5 | 368 | 95 |
| 6 | 382 | 76 |
| 7 | 382 | 84 |
| 8 | 371 | 83 |
| 9 | 371 | 84 |
| 10 | 375 | 80 |
| 11 | 372 | 72 |
| 12 | 379 | 87 |
| 13 | 381 | 79 |
| 14 | 383 | 78 |
| 15 | 377 | 79 |
| 16 | 384 | 82 |
| 17 | 371 | 86 |
| 18 | 371 | 85 |
| 19 | 382 | 79 |
| 20 | 380 | 78 |
| 21 | 385 | 81 |
| 22 | 385 | 82 |
| 23 | 382 | 83 |
| 24 | 373 | 85 |
| 25 | 371 | 95 |
| 26 | 371 | 86 |
| 27 | 372 | 88 |
| 28 | 380 | 78 |
| 29 | 381 | 77 |
| 30 | 371 | 94 |
| Mean | 377.00 | 83.24 |
| Min | 366.00 | 72.00 |
| Max | 385.00 | 95.00 |
| Standard deviation | 5.82 | 5.62 |

EXAMPLE 4

Example 1 was repeated, but a nylon string having a diameter of 4 mm and weighted at the end was allowed to hang into the tube to a depth of 4300 mm. 2160 g of catalyst were introduced and the string was pulled continuously from the tube as charging progressed. Charging took about 1 minute.

| Experiment No. | Fill height (cm) | Differential pressure (mbar) |
|---|---|---|
| 1 | 395 | 58 |
| 2 | 404 | 56 |
| 3 | 405 | 56 |
| 4 | 398 | 61 |
| 5 | 394 | 62 |
| 6 | 405 | 63 |
| 7 | 413 | 65 |
| 8 | 400 | 59 |
| 9 | 400 | 61 |
| 10 | 402 | 57 |
| 11 | 399 | 55 |
| 12 | 404 | 65 |
| 13 | 410 | 57 |
| 14 | 408 | 51 |
| 15 | 405 | 54 |
| 16 | 409 | 52 |
| 17 | 399 | 51 |
| 18 | 397 | 58 |
| 19 | 408 | 52 |
| 20 | 408 | 59 |
| 21 | 411 | 64 |
| 22 | 411 | 55 |
| 23 | 409 | 52 |
| 24 | 400 | 52 |
| 25 | 398 | 56 |
| 26 | 398 | 57 |
| 27 | 400 | 58 |
| 28 | 407 | 54 |
| 29 | 409 | 54 |
| 30 | 399 | 57 |
| Mean | 403.66 | 57.03 |
| Min | 394.00 | 51.00 |
| Max | 413.00 | 65.00 |
| Standard deviation | 5.35 | 4.19 |

It can be seen that the use of the filling string leads to a less dense (smaller pressure difference) and more uniform charge (smaller standard deviation of the differential pressure), with example 4 giving the best results.

EXAMPLE 5

50 ml of a catalyst (ring shape; external diameter×height× internal diameter: 5.5×3×3 mm) were allowed to drop into a tube having an internal diameter of 21 mm and a length of 6400 mm and the proportion of fractured catalyst particles was determined.

| Experiment | Without filling aid | With nylon string introduced (4 mm diameter; hanging in to a depth of 3500 mm) |
|---|---|---|
| 1 | 15.7% | 5.2% |
| 2 | 12.7% | 3.8% |

EXAMPLE 6

Comparative Example

A tube having an internal diameter of 21 mm and a length of 6400 mm was charged with a catalyst (ring shape; external diameter×height×internal diameter; 5.5×3×3 mm) to a fill height of 6000 mm. Charging took about 4 minutes.

| Experiment | Amount introduced (g) | Bulk density (kg/l) | Differential pressure (mbar) |
|---|---|---|---|
| 1 | 1432 | 0.689 | 1146 |
| 2 | 1412 | 0.679 | 1185 |
| 3 | 1410 | 0.678 | 1174 |
| 4 | 1420 | 0.683 | 1180 |
| 5 | 1423 | 0.685 | 1178 |
| 6 | 1422 | 0.684 | 1175 |
| 7 | 1422 | 0.684 | 1188 |
| 8 | 1420 | 0.683 | 1169 |
| 9 | 1422 | 0.684 | 1172 |
| Mean | | 0.683 | 1174 |

EXAMPLE 7

Example 6 was repeated, but a nylon string having a diameter of 4 mm and weighted at the end was allowed to hang into the tube to a depth of 3500 mm, 630 g of catalyst were introduced, the string was removed and a further 620 g of catalyst were introduced and the amount of catalyst was then brought to a fill height of 6000 mm. Charging took about 2 minutes for each of the layers introduced.

| Experiment | Amount introduced (g) | Bulk density (kg/l) | Differential pressure (mbar) |
|---|---|---|---|
| 1 | 1402 | 0.675 | 1151 |
| 2 | 1403 | 0.675 | 1099 |
| 3 | 1401 | 0.674 | 1114 |
| 4 | 1398 | 0.673 | 1115 |
| 5 | 1401 | 0.674 | 1112 |
| 6 | 1404 | 0.676 | 1127 |
| 7 | 1401 | 0.674 | 1109 |
| 8 | 1405 | 0.676 | 1142 |
| 9 | 1404 | 0.676 | 1128 |
| Mean | | 0.675 | 1122 |

Comparison of example 6 and example 7 shows that the catalyst bed in example 7 is looser (lower bulk density) and leads to a smaller differential pressure.

We claim:

1. A method of charging a vertical tube having an internal diameter of 50 mm or less with catalyst particles, the method comprising:
    introducing a filling aid into the vertical tube,
        where the filling aid comprises a flexible elongated body and a ratio of the cross section of the flexible elongated body to the cross section of the tube is from 0.003 to 0.08, and
        (1) the filling aid has no elements which extend radially outward from the flexible body, or
        (2) the filling aid comprises spacers which are arranged at a distance from one another and extend perpendicular to the longitudinal direction of the filling aid, wherein the projection of the spacers onto a plane perpendicular to the longitudinal direction of the filling aid has no larger area than a cross section of the flexible body, and the filling aid has no other elements than said spacers, which extend radially outward from the flexible body;
    introducing the catalyst particles into the tube, and withdrawing the filling aid during introduction of the catalyst particles so that the lower end of the filling aid is always above the fill height of the catalyst particles in the tube, thereby obtaining a charged vertical tube having a bulk density of the packed catalyst particles and a pressure drop lower than the bulk density and the pressure drop of the vertical tube in which the catalyst particles are introduced without the filling aid for charging the vertical tube having the internal diameter of 50 mm or less with the catalyst particles.

2. The method according to claim 1, wherein the flexible elongated body has an essentially circular cross section.

3. The method according to claim 2, wherein the ratio of the cross section of the flexible elongated body to the cross section of the tube is from 0.005 to 0.07.

4. The method of claim 3, wherein the catalyst particles comprise shaped bodies which comprise a catalytically active composition.

5. The method of claim 3, wherein the catalyst particles comprise a catalytic composition applied in the form of a shell to an inert support.

6. The method of claim 2, wherein the catalyst particles comprise shaped bodies which comprise a catalytically active composition.

7. The method of claim 2, wherein the catalyst particles comprise a catalytic composition applied in the form of a shell to an inert support.

8. The method of claim 1, wherein the flexible elongated body comprises a textile string or a textile tape.

9. The method of claim 8, wherein the catalyst particles comprise shaped bodies which comprise a catalytically active composition.

10. The method of claim 8, wherein the catalyst particles comprise a catalytic composition applied in the form of a shell to an inert support.

11. The method of claim 1, wherein the filling aid comprises spacers which are arranged at the distance from one another and extend perpendicular to the longitudinal direction of the filling aid, wherein the projection of the spacers onto the plane perpendicular to the longitudinal direction of the filling aid has no larger area than the cross section of the flexible body, and the filling aid has no other elements than said spacers, which extend radially outward from the flexible body.

12. The method of claim 11, wherein the catalyst particles comprise shaped bodies which comprise a catalytically active composition.

13. The method of claim 11, wherein the catalyst particles comprise a catalytic composition applied in the form of a shell to an inert support.

14. The method of claim 1, which comprises successively:
introducing the filling aid into the tube in such a way that the lower end of the filling aid is located at a first height,
introducing catalyst particles into the tube to below the first height,
optionally, partly withdrawing the filling aid from the tube so that the lower end of the filling aid is located at a second or further height and introducing catalyst particles into the tube to below the second or further height, and
withdrawing the filling aid completely from the tube and filling the tube with catalyst particles up to the final fill height.

15. The method of claim 14, wherein the catalyst particles comprise shaped bodies which comprise a catalytically active composition.

16. The method of claim 1, wherein the catalyst particles comprise shaped bodies which comprise a catalytically active composition.

17. The method of claim 1, wherein the catalyst particles comprise a catalytic composition applied in the form of a shell to an inert support.

18. The method of claim 1, wherein the filling aid has no elements which extend radially outward from the flexible body.

19. The method of claim 1, wherein the maximum diameter of the catalyst particles is from 3 to 8 mm.

20. A method of charging a vertical tube having an internal diameter of 50 mm or less with catalyst particles, the method comprising:
introducing a filling aid into the vertical tube, where the filling aid comprises a flexible elongated body and a ratio of the cross section of the flexible elongated body to the cross section of the tube is from 0.003 to 0.08,
introducing the catalyst particles into the tube, and
withdrawing the filling aid during introduction of the catalyst particles so that the lower end of the filling aid is always above the fill height of the catalyst particles in the tube,
wherein the filling aid comprises a rigid terminating element whose density is greater than that of the flexible body, and
(1) the filling aid does not comprise other elements which extend radially outward from the flexible body, or
(2) the filling aid comprises spacers which are arranged at a distance from one another and extend perpendicular to the longitudinal direction of the filling aid, wherein the projection of the spacers onto a plane perpendicular to the longitudinal direction of the filling aid has no larger area than a cross section of the flexible body, and the filling aid has no other elements than said spacers and the rigid terminating element, which extend radially outward from the flexible body,
thereby obtaining a charged vertical tube having a bulk density of the packed catalyst particles and a pressure drop lower than the bulk density and the pressure drop of the vertical tube in which the catalyst particles are introduced without the filling aid for charging the vertical tube having the internal diameter of 50 mm or less with the catalyst particles.

21. The method of claim 20, wherein the catalyst particles comprise shaped bodies which comprise a catalytically active composition.

22. The method of claim 20, wherein the catalyst particles comprise a catalytic composition applied in the form of a shell to an inert support.

23. The method of claim 20, wherein the filling aid does not comprise other elements which extend radially outward from the flexible body.

24. The method of claim 20, wherein the filling aid comprises spacers which are arranged at the distance from one another and extend perpendicular to the longitudinal direction of the filling aid, wherein the projection of the spacers onto the plane perpendicular to the longitudinal direction of the filling aid has no larger area than the cross section of the flexible body, and the filling aid has no other elements than said spacers and the rigid terminating element, which extend radially outward from the flexible body.

25. The method of claim 20, wherein the maximum diameter of the catalyst particles is from 3 to 8 mm.

* * * * *